US011745392B2

(12) United States Patent
McCarthy et al.

(10) Patent No.: US 11,745,392 B2
(45) Date of Patent: Sep. 5, 2023

(54) TECHNIQUES FOR CASTING FROM ADDITIVELY FABRICATED MOLDS AND RELATED SYSTEMS AND METHODS

(71) Applicant: Formlabs, Inc., Somerville, MA (US)

(72) Inventors: Alex McCarthy, Watertown, MA (US); Maxim Lobovsky, Cambridge, MA (US); Martin Galese, Newton, MA (US)

(73) Assignee: Formlabs, Inc., Somerville, MA (US)

( * ) Notice: Subject to any disclaimer, the term of this patent is extended or adjusted under 35 U.S.C. 154(b) by 472 days.

(21) Appl. No.: 16/871,646

(22) Filed: May 11, 2020

(65) Prior Publication Data
US 2020/0346372 A1 Nov. 5, 2020

Related U.S. Application Data

(63) Continuation of application No. 15/981,265, filed on May 16, 2018, now Pat. No. 10,647,028.

(60) Provisional application No. 62/507,673, filed on May 17, 2017, provisional application No. 62/507,661, filed on May 17, 2017.

(51) Int. Cl.
| | | |
|---|---|---|
| *B29C 33/38* | (2006.01) | |
| *B29C 33/56* | (2006.01) | |
| *B29C 64/112* | (2017.01) | |
| *B29C 39/36* | (2006.01) | |
| *B28B 7/34* | (2006.01) | |
| *B29C 64/129* | (2017.01) | |
| *B29C 33/00* | (2006.01) | |
| *B29C 33/40* | (2006.01) | |
| *B29C 39/26* | (2006.01) | |
| *B29C 33/52* | (2006.01) | |
| *B22D 29/00* | (2006.01) | |
| *B33Y 10/00* | (2015.01) | |
| *B29K 71/00* | (2006.01) | |
| *B29K 503/08* | (2006.01) | |
| *B29C 39/24* | (2006.01) | |

(52) U.S. Cl.
CPC .......... *B29C 33/3842* (2013.01); *B22D 29/00* (2013.01); *B28B 7/346* (2013.01); *B29C 33/0011* (2013.01); *B29C 33/3807* (2013.01); *B29C 33/3814* (2013.01); *B29C 33/40* (2013.01); *B29C 33/52* (2013.01); *B29C 33/565* (2013.01); *B29C 39/26* (2013.01); *B29C 39/36* (2013.01); *B29C 64/112* (2017.08); *B29C 64/129* (2017.08); *B33Y 10/00* (2014.12); *B29C 39/24* (2013.01); *B29C 2033/385* (2013.01); *B29K 2071/00* (2013.01); *B29K 2503/08* (2013.01); *B29K 2901/10* (2013.01)

(58) Field of Classification Search
CPC . B29B 7/346; B29C 33/3842; B29C 33/0011; B29C 33/3807; B29C 33/3814; B29C 33/40; B29C 33/52; B29C 33/565; B29C 39/24; B29C 39/26; B29C 39/36; B29C 64/112; B29C 64/129; B29C 2033/385; B29K 2071/00; B29K 2503/08; B29K 2901/10
See application file for complete search history.

(56) References Cited

U.S. PATENT DOCUMENTS

| | | | |
|---|---|---|---|
| 2,832,112 A | 4/1958 | Laurenz et al. | |
| 3,186,041 A | 6/1965 | Horton | |
| 3,774,668 A | 11/1973 | Heimgartner | |
| 4,051,296 A | 9/1977 | Windecker | |
| 4,141,781 A | 2/1979 | Greskovich et al. | |
| 4,221,748 A | 9/1980 | Pasco et al. | |
| 5,014,763 A | 5/1991 | Frank | |
| 9,228,073 B2 | 1/2016 | He et al. | |
| 10,144,178 B2 * | 12/2018 | Meisner | B33Y 50/02 |
| 10,144,181 B2 * | 12/2018 | DeSimone | B33Y 10/00 |
| 10,647,028 B2 | 5/2020 | McCarthy et al. | |
| 11,097,449 B2 | 8/2021 | McCarthy et al. | |
| 2003/0129385 A1 | 7/2003 | Hojo et al. | |
| 2004/0170925 A1 | 9/2004 | Roach et al. | |

(Continued)

FOREIGN PATENT DOCUMENTS

| | | |
|---|---|---|
| EP | 1652644 A1 | 5/2006 |
| GB | 2312184 A | 10/1997 |

(Continued)

OTHER PUBLICATIONS

Invitation to Pay Additional Fees for International Application No. PCT/US18/32947 dated Jul. 20, 2018.

(Continued)

*Primary Examiner* — Jane L Stanley
(74) *Attorney, Agent, or Firm* — Wolf, Greenfield & Sacks, P.C.

(57) ABSTRACT

According to some aspects, a method is provided of casting an object from a mold, the method comprising obtaining a mold comprising a hollow shell of rigid material, the material comprising a thermoset polymer having a plurality of pores formed therein, providing a metal and/or ceramic slurry into an interior of the mold, exposing at least part of the mold to a low pressure environment so that a net flow of gas is produced from the interior of the mold into the low pressure environment. According to some aspects, a method of forming a porous mold is provided. According to some aspects, a photocurable liquid composition is provided, comprising a liquid photopolymer resin, particles of a solid material, in an amount between 30% and 60% by volume of the composition, and a water-soluble liquid.

7 Claims, 6 Drawing Sheets

(56) References Cited

U.S. PATENT DOCUMENTS

| | | | |
|---|---|---|---|
| 2007/0003749 A1* | 1/2007 | Asgari | C08J 9/26 427/372.2 |
| 2011/0104500 A1 | 5/2011 | Southwell et al. | |
| 2011/0129924 A1* | 6/2011 | Ying | A61P 27/00 435/396 |
| 2014/0339745 A1 | 11/2014 | Uram | |
| 2018/0318922 A1 | 11/2018 | Valls Angles | |
| 2018/0370080 A1 | 12/2018 | McCarthy et al. | |
| 2018/0370081 A1 | 12/2018 | McCarthy et al. | |
| 2019/0009483 A1 | 1/2019 | Meadows et al. | |
| 2021/0221047 A1* | 7/2021 | Levy | B32B 27/18 |
| 2021/0339432 A1 | 11/2021 | McCarthy et al. | |
| 2022/0097291 A1* | 3/2022 | Dikovsky | B29C 64/106 |

FOREIGN PATENT DOCUMENTS

| | | | |
|---|---|---|---|
| JP | H09-292440 A | 11/1997 | |
| JP | 2009542840 A1 * | 12/2009 | ............ A61L 27/56 |
| KR | 2014-0086129 A | 7/2014 | |
| WO | WO 95/28244 A1 | 10/1995 | |
| WO | WO 98/06560 A1 | 2/1998 | |

OTHER PUBLICATIONS

International Search Report and Written Opinion for International Application No. PCT/US18/32947 dated Sep. 24, 2018.
International Preliminary Report on Patentabiltiy for International Application No. PCT/US2018/032947 dated Nov. 28, 2019.
Pfeifer et al., Rapid Tooling of Ceramic Parts and Molds using High-Pressure Slip Casting of Si3N4, Annual International Solid Freeform Fabrication Symposium. 1999. 8 pages.

* cited by examiner

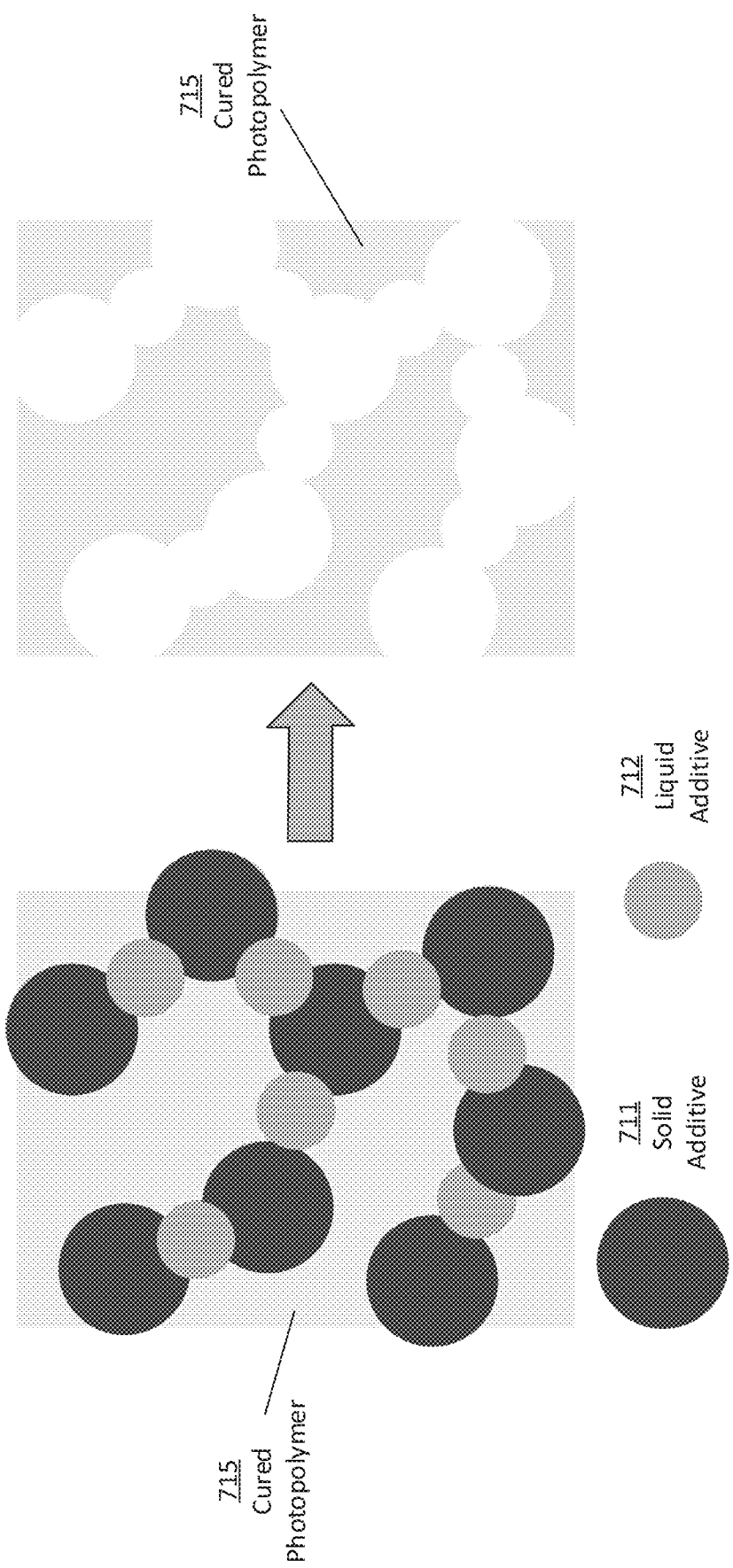

TECHNIQUES FOR CASTING FROM ADDITIVELY FABRICATED MOLDS AND RELATED SYSTEMS AND METHODS

CROSS-REFERENCE TO RELATED APPLICATIONS

The present application claims the benefit as a continuation under 35 U.S.C. § 120 of U.S. patent application Ser. No. 15/981,265, filed May 16, 2018, which claims the benefit under 35 U.S.C. § 119(e) of U.S. Provisional Patent Application No. 62/507,673, filed May 17, 2017, and of U.S. Provisional Patent Application No. 62/507,661, filed May 17, 2017, each of which is hereby incorporated by reference in its entirety.

FIELD OF INVENTION

The present invention relates generally to systems and methods for the production of molds via additive fabrication, e.g., 3-dimensional printing, and to systems and methods for casting parts from such molds.

BACKGROUND

Gelcasting is a process in which a slurry of ceramic or metallic powders and organic monomers is poured into a mold and then formed into a gel. To retrieve the gel part, the mold may be formed from a material that is dissolvable or otherwise easily removable. For instance, the mold may be formed from wax, which can then be melted or dissolved away. Once the mold is removed, the gel can be dried and sintered to form a solid ceramic or metal part.

Additive fabrication, e.g., 3-dimensional (3D) printing, provides techniques for fabricating objects, typically by causing portions of a building material to solidify at specific locations. Additive fabrication techniques may include stereolithography, selective or fused deposition modeling, direct composite manufacturing, laminated object manufacturing, selective phase area deposition, multi-phase jet solidification, ballistic particle manufacturing, particle deposition, laser sintering or combinations thereof. Many additive fabrication techniques build parts by forming successive layers, which are typically cross-sections of the desired object. Typically each layer is formed such that it adheres to either a previously formed layer or a substrate upon which the object is built.

In one approach to additive fabrication, known as stereolithography, solid objects are created by successively forming thin layers of solid material by curing portions of a liquid photopolymer. Exposure to actinic radiation cures a thin layer of the liquid photopolymer, which causes it to harden and adhere to previously cured layers or to the bottom surface of the substrate.

SUMMARY

According to some aspects, a method is provided of removing an object from a mold, the method comprising obtaining an object formed within a mold, the mold comprising a shell of rigid material that comprises a thermoset polymer having a plurality of pores formed therein, and the object comprising a solidified metal and/or ceramic slurry, applying a solvent to the mold, thereby softening the mold, and mechanically removing the softened mold from the object.

According to some aspects, a photocurable liquid composition is provided, comprising a liquid photopolymer resin, particles of a solid material, in an amount between 30% and 60% by volume of the composition, and a water-soluble liquid.

According to some aspects, a method is provided of casting an object from a mold, the method comprising obtaining a mold comprising a hollow shell of rigid material, the material comprising a thermoset polymer having a plurality of pores formed therein, providing a metal and/or ceramic slurry into an interior of the mold, exposing at least part of the mold to a low pressure environment so that a net flow of gas is produced from the interior of the mold into the low pressure environment.

According to some aspects, a method is provided of forming a porous mold, the method comprising forming, via additive fabrication, an object comprising a hollow shell of rigid material, wherein the material comprises a thermoset polymer and a plurality of solid particles embedded within the polymer, removing at least some of the solid particles from the object, thereby forming a plurality of pores in the hollow shell.

The foregoing embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

FIG. 7A depicts the structure of a fugitive mold formed via additive fabrication and having solid and liquid additives present therein, according to some embodiments; and FIG. 7B depicts the structure of the fugitive mold of FIG. 7A after removal of the solid and liquid additives, according to some embodiments.

DETAILED DESCRIPTION

Figure 1:
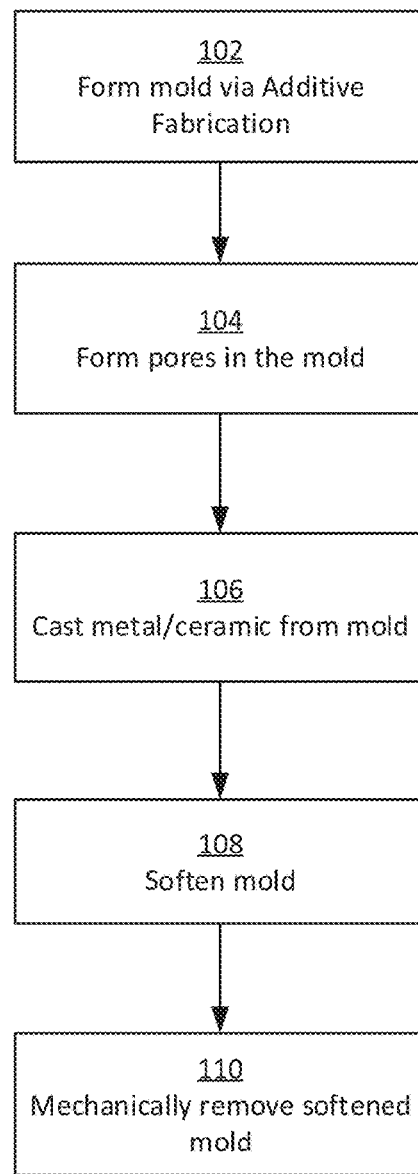
FIG. 1 is a flowchart of a method of casting a metal and/or ceramic object from a fugitive mold formed via additive fabrication, according to some embodiments.

Various additive fabrication techniques may be applied to fabricate objects having shapes suitable for use as molds.

For instance, a hollow shell may be fabricated and used as a one-part mold, or two objects may be fabricated that have been designed to be joined together and used as a two-part mold. In terms of the quality of the resulting cast, one-part molds are generally preferable because multi-part molds can suffer from misalignment of the molds and can produce mold lines in the resulting part as a result of the seams between the molds. One-part molds can present a processing challenge, however, since the cast part must be retrieved from the mold after casting. For many one-part molds, at least partial destruction of the mold is inevitable due to the geometry of the part making it impossible to remove the mold whilst leaving it intact.

Certain additive fabrication techniques utilize materials to fabricate molds that may be readily dissolved in a suitable solvent. For example, additive fabrication that utilizes acrylonitrile butadiene styrene (ABS) to fabricate a mold will produce a mold that can readily be dissolved in a solvent such as acetone. Other additive fabrication techniques, however, may use materials which are less readily dissolved, or essentially insoluble in any suitable or practicable solvent, which inhibits safe removal of a mold fabricated via such techniques without damage to the part cast within it. In particular, additive fabrication techniques that fabricate objects using thermoset materials, as opposed to thermoplastic materials, generally produce objects that cannot be dissolved in any conventional solvent. For instance, stereolithography, which applies radiation to a liquid photopolymer and thereby cures the liquid into a solid thermoset polymer, forms objects that are not dissolved in conventional solvents. In addition, objects so fabricated from thermoset materials do not typically melt or otherwise thermally degrade at temperatures allowing removal of the mold material without risking damage to the part cast inside it. At the same time, many processes capable of forming molds from such thermoset materials are capable of improved surface finish, accuracy, and other desirable qualities.

The inventors have recognized and appreciated techniques for removal of a thermoset polymer mold from a part cast within the mold by applying a solvent to the mold that will mechanically degrade, though not necessarily dissolve, the mold. While, as discussed above, thermoset polymers are not dissolvable in conventional solvents, the inventors have recognized and appreciated that certain solvents will, over time, alter the mechanical properties of a thermoset polymer mold sufficiently to allow mechanical removal of the mold from a part cast inside the mold without substantial risk of damage to the part. In particular, certain solvents have been observed to cause a thermoset polymer mold to swell and soften, which allows the mold to then be peeled away from a part cast within the mold.

According to some embodiments, a part may be gelcast from a thermoset polymer mold. In such cases, there may be a benefit to keeping the part at low temperatures during removal of the mold since, at that stage in gelcasting, the part has not yet been sintered and therefore may be structurally stronger if held at a low temperature, which may include freezing the part. As such, the application of a solvent to swell and soften the thermoset polymer mold described above may utilize solvent at a low temperature so that the step of mechanically weakening the mold occurs while the part is held at a low temperature. The mold can then be removed whilst in the cold solvent, or after removal to a similarly cold environment.

Another challenge with molds, particularly one-part molds, is that voids can be created when filling the mold with a casting material due to the casting material not filling the entire interior of the mold. In particular, trapped air pockets can inhibit the flow of casting material into some regions of the interior, leading to defects in the cast part. One approach to addressing this issue is to produce small paths in the mold through which air can escape but that are sufficiently small to inhibit the casting material from escaping, such as by poking holes using a thin needle. In some cases, the mold can be filled with casting material in a low pressure environment, which aids in evacuation of air from the interior of the mold and encourages the casting material to fill the mold. The process of forming paths in the mold through which air can escape requires, however, manual application of a sharp implement to the fabricated mold, which can cause unintended damage to the mold and/or may be time consuming.

The inventors have recognized and appreciated techniques for fabricating a porous thermoset polymer mold that exhibits an open cell network which allows gas to pass through the mold whilst retaining casting materials within the mold. In some embodiments, a solid additive may be mixed with a liquid photopolymer to produce a composition from which a mold can be additively fabricated using conventional additive fabrication techniques, such as stereolithography. Subsequent to fabrication of the mold, at least some of the solid additive can be removed from the mold, thereby producing a thermoset polymer mold having pores formed therein. The solid additive may be a powder such that fine particles are interspersed throughout the fabricated mold. These particles may be removed by dissolving, melting, or otherwise changing the physical state of the particles such that they are separated from the mold.

In some embodiments, a non-photopolymer liquid additive may be mixed with the liquid photopolymer and solid additive to produce a mixture that has a desirable viscosity for additive fabrication. Without such a liquid additive, a mixture of liquid photopolymer and a solid additive may have a viscosity that is sufficiently high that conventional additive fabrication processes that utilize the mixture as a source material either do not work successfully or suffer from undesirable degradation of the quality of a fabricated mold. By including a suitable liquid additive, the viscosity of the mixture may be reduced so that the quality of a mold fabricated from the mixture is commensurate with the quality that would be expected when fabricating the same mold from only the liquid photopolymer.

Following below are more detailed descriptions of various concepts related to, and embodiments of, techniques for the production of molds via additive fabrication and for casting from such molds. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

FIG. 1 is a flowchart of a method of casting a metal and/or ceramic object from a fugitive mold formed via additive fabrication, according to some embodiments. At a high level, method 100 includes steps of designing and fabricating a mold via additive fabrication (act 102), forming pores in the mold (act 104), casting a metal or ceramic part in the mold whilst utilizing the pores to ensure the part substantially fills the mold (act 106), applying solvent to the mold to soften it (act 108) and mechanically removing the softened mold from the part (act 110). Subsequently, the part may be sintered or otherwise formed into a final part. Each of these steps will be discussed in further detail below, and it will be appreciated that a suitable process may be envisioned that performs some, but not all of the steps of illustrative method 100. For instance, the process of casting in act 106 may be performed using a supplied mold (see FIG. 2), the process of fabricating a porous mold in acts 102 and 104 may be performed without subsequent casting steps (see FIG. 3), or the process of softening and removing a mold from a cast part in acts 108 and 110 may be performed using a supplied cast part within a mold (see FIG. 4).

In the example of FIG. 1, in act 102 a mold is formed via additive fabrication. In some embodiments, the mold is formed of a thermoset polymer via techniques such as, but not limited to, stereolithography or inkjet fabrication.

According to some embodiments, act 102 may include generation of a computer model of the mold to be formed via additive fabrication. In some embodiments, an object to be molded may be designed in computer-aided design (CAD) software, scanned from an existing object, or otherwise created as a three-dimensional computer model. Based on the desired geometry of the part, a comparatively thin shell may be automatically generated enclosing the surface of the part (i.e., so that the part would be contained within the hollow interior of the shell). This shell, once fabricated, will serve as the mold structure in subsequent steps of method 100. In some embodiments, the dimensions of the part or shell may be adjusted to compensate for undesired dimensional changes that may occur during the casting process. For example, in gelcasting, depending on the specific slurry formulation and geometry of the shell, the processing of slurry into a final part may cause substantial shrinkages, often between 15% and 20% from the original molded form to the final part. As such, software may automatically compensate for the expected shrinkage by, for example, scaling the geometry of the part or shell globally by 15-20%. Either the part may be modified to compensate prior to generation of the shell, or the shell may be modified after its generation.

According to some embodiments, a shell may be automatically generated to have a thickness that is selected based on the stiffness of the material from which it will be fabricated. As an illustrative example, the inventors have fabricated a shell mold from the "Durable" photopolymer resin sold by Formlabs Inc. under the product number FLDUCL01. For this material, the inventors have found a shell thickness between 0.5 mm and 0.8 mm to be an effective thickness. Thinner shells may be too weak and flexible to fabricated whilst withstanding forces in subsequent processes of method 100. Thicker shells may be more difficult to remove from the cast part in act 110, which may unnecessarily increase the process time. In some embodiments, software may be operated to automatically generate a shell for a three-dimensional model of a part to be fabricated via additive fabrication, the shell having a thickness between 0.2 mm and 1 mm, or a thickness between 0.4 mm and 0.8 mm, or a thickness between 0.5 mm and 0.7 mm.

According to some embodiments, a computer-based model of a shell may be automatically and/or manually modified in various ways, such as by adding reinforcing ribs, struts, and/or similar structures. Such reinforcing structures may serve to limit global and/or local deformation in the mold during later process steps of method 100. In some cases, reinforcing structures may be advantageously tailored to the unique mold geometry using manual steps. Such manual customization, however, may involve undesirable user interaction and time, including training in how a mold may deform under injection pressure. Accordingly, it may be desirable for software to provide various methods of guided and/or fully automated reinforcement structure generation techniques.

In some embodiments, Boolean operations may be applied to the three-dimensional model of the shell with a three-dimensional model of a generic scaffolding geometry. The inventors have found that the following characteristics may result in particularly effective scaffolding structures. First, scaffolding components that are no thicker than 1 mm may aid in rapid demolding. Second, a scaffold that is "open-cell" may allow solvent to penetrate the mold more effectively during demolding. Third, a distance between any two members within the scaffold of no more than 5 mm may ensure that the shell is well-reinforced. The inventors have recognized that the desirable qualities of scaffolding for the shell bear similar characteristics to desirable qualities of structures for supporting additively manufactured parts. As a result, techniques such as those described in U.S. application Ser. No. 14/543,138, titled "Systems and Methods of Simulating Intermediate Forms for Additive Fabrication," filed on Nov. 17, 2014, which is incorporated herein by reference in its entirety, may be useful for the development of scaffolding. In particular, forces expected to be caused by an injection molding process, including injection and/or demolding, may be considered by the simulations described in U.S. application Ser. No. 14/543,138, results of which may be used to generate additional support structure and/or modify the geometry of existing supporting structures.

According to some embodiments, a computer-based model of a shell may be modified to add additional features that support processing of later steps of method 100. As one example, a port or "sprue" shape may be coupled to the shell so that an opening extends outwards from the shell. Such a port opening may allow slurry to be injected into the mold through the port. In some cases, such a sprue may be most advantageously positioned at a location on the shell that allows for an even distribution of slurry into the shell during injection.

In some embodiments, a sprue may comprise two parts. A first part of the sprue may form a plug that fits into and through a port on one side of a vacuum chamber, forming a pressure tight seal between the sprue and the port walls. A second part of the sprue may form a port that may be connected to a slurry injection source. In some cases, the second part may be configured so that it can be attached pressure tight to the injection source. In some embodiments, the sprue may be structured to include a standard luer lock fitting on the end of the sprue, allowing the fitting to be attached to an injection source.

In some embodiments, multiple sprues may be added to a shell to form multiple channels into the shell for injected material. The generation of multiple sprues in the shell may be advantageous should the shell incorporate internal restrictions or narrow portions that could restrict the flow of the slurry through the interior of the shell.

According to some embodiments, vent holes may be automatically placed in the three-dimensional model of the shell. With the case of stereolithography or other additive manufacturing techniques that may leave residue or material within the shell, vents may be added to temporarily allow for the removal of such unwanted material. In some cases, vent holes of approximately 1 mm in diameter may be generated in the shell model so that, once the shell is fabricated, the vents can aid in a cleaning process that removes the residue (e.g., the IPA washing process used in stereolithography). In some embodiments, vent holes may be advantageously placed to allow flow through all major parts of the mold when washing solvent is injected (e.g., via the sprue). Prior to injection of slurry, such vent holes may be sealed to prevent slurry from exiting the mold during casting. In some embodiments, the vent holes may be sealed prior to the molding process by application of a fast curing glue, such as cyanoacrylate, and/or additional photopolymerizable resin to the holes.

Irrespective of whether the generated three-dimensional shell object includes reinforcing structures, a port/sprue and/or vent holes, the shell object may be manufactured in act 102 using any suitable additive manufacturing technique(s). The inventors have found particular and unexpected advantages in forming such a part using stereolithographic techniques, such as those used by the Form 2 3D printer sold by Formlabs, to cure Formlab's "Durable" resin, available under product number FLDUCL01. As discussed further below, the selection of a material from which a mold is fabricated may be made with respect to a given solvent in order to achieve the desired degree of swell or other mechanical degradation of the mold prior to its removal. The material may also be selected so as to provide adequate structural support during the printing and casting processes with a minimum of thickness and material.

In some embodiments, a composition from which the shell object is fabricated includes a liquid photopolymer combined with a solid additive that is non-reactive with respect to the photopolymer. As will be described further below, the solid additive may be in the form of particles that allow the shell object to be fabricated from the composition via conventional additive fabrication techniques, and which can then be removed from the object, at least in part, to produce pores within the shell. In some cases, both a solid additive and liquid additive may be included in the liquid photopolymer composition. Any combination of such additives described below may be used as a source material for fabricating the object in act 102.

As discussed above, a mold fabricated from a thermoset polymer may be softened by application of a suitable solvent. While it may be desirable to maximize the degree to which the mold swells in the solvent, and thus yield easier shell mold removal, the same thermoset polymer properties that result in substantial swelling, such as lower crosslink densities and lower glass transitions, may also be associated with lower stiffness of the polymer. Lower stiffness, in turn, requires shell molds to be fabricated with greater shell thicknesses and/or increased supporting ribs or similar structures in order to compensate for the lower stiffness. The inventors have appreciated that these contradictory difficulties may be effectively addressed by the introduction of an additional, embedded, stiffening material into the liquid photopolymer used to fabricate the shell mold. As such, according to some embodiments, rigid particles and/or fibers may be included within a liquid photopolymer composition from which a mold is fabricated in act 102.

According to some embodiments, rigid particles, such as silica or alumina, may be incorporated into the liquid photopolymer composition and thereby embedded into the final cured material in the shell mold. According to some embodiments, loadings of 10% to 30% by volume may result in increases in stiffness between 20% and 100%, depending on the stiffness of the particles and the original polymer. The particles may have a diameter between 1 μm to 20 μm range in order to promote good dispersion, low viscosity, and allow printing of 25 μm to 100 μm layers. Such particles may not, however, substantially reduce the degree of swell of the polymer-portion of the shell mold composite or increase the forces required to remove the shell mold after solvent exposure.

According to some embodiments, fibrous material, such as glass or carbon fibers, may be incorporated into the liquid photopolymer composition in random or controlled orientations in order to strengthen the shell mold.

According to some embodiments, particulate material with gas permeability may be incorporated into the liquid photopolymer composition to increase the permeability of the shell mold. As an example, a composition may include a high volume fraction loading of a gas permeable polymer powder, such as particles of PDMS, PMP, or another polymer known to be gas permeable, thus increasing the gas permeability of the mold apart from perforations.

In some embodiments, once a fabricated shell part has been formed, post processing may be applied to the part in which the part is removed from the build platform and immersed into a bath of 90% or greater isopropyl alcohol (IPA). The IPA bath may remove a significant portion of uncured resin from the external surfaces of the shell. The part may be left in the bath for approximately 10 minutes, for example.

In some cases, such a bath may not be sufficient to remove uncured resin from the interior surfaces of the shell, however. As such, in some embodiments a syringe or similar device may be attached to the shell (e.g., via one or more sprue connections) and negative pressure applied through said syringe to draw IPA into and through the shell submerged in IPA via vent holes formed in the surface of the shell. This process may be repeated multiple times to remove substantially all uncured resin from the interior of the shell. In some embodiments, the pressure applied may be positive such that IPA is introduced through one or more sprue connections into the interior of the shell then exiting or draining from the shell through the one or more vent holes mentioned above. The inventors have found it advantageous to limited the total exposure period to IPA, however (e.g., to no more than 20 minutes) in order to avoid unwanted penetration and weakening of the shell at this stage. Following the cleaning by IPA, the shell may be dried thoroughly, by the use of forced air and/or by heating (e.g., to a temperature of 50-60° C. for approximately 15 minutes). Such elevated temperatures may further serve to ensure completion of the curing process of the resin used and the evaporation of any IPA or other cleaning solvent from the interior of the shell.

In act 104, pores may be formed within the mold fabricated in act 102. In some embodiments, small perforations may be added across the surface of the shell. These perforations may be produced in various ways, including by the manual use of a pin to mechanically pierce the shell wall. Such perforations are advantageously small enough so as to substantially contain the casting materials during a subsequent casting process, while remaining sufficiently large to allow gas to flow through them (e.g., during the evacuation of the mold when placed under vacuum). In some embodiments, such perforations may have a diameter of between 10 μm and 50 μm, or between 15 μm and 40 μm, or approximately 25 μm.

According to some embodiments, the density of such perforations may be produced based upon the geometry of the shell. As an example, certain regions, such as blind channels, high aspect ratio channels, and areas where there will be "knit lines," may cause incomplete injection of casting materials. As such, these regions may be provided with comparatively more perforations than other regions.

In some embodiments, the three-dimensional model of the shell may be manually or automatically modified in act 102 in order to include features allowing for the easier placement of perforations into the shell mold. As one example, small dimples or similar surface indications may be formed directly into the surface of the mold guiding a perforating tool visually and/or mechanically to the desired locations. These perforations greatly increase the utility of stereolithographic technology for the fabrication of shell molds, or indeed for any fabrication process which typically results in a gas impermeable solid. In other additive manufacturing techniques, however, such as selective laser sintering or fused filament fabrication, the material formed by the fabrication process may be inherently gas permeable and thus require fewer, or no, perforations.

As discussed above, while the addition of the types of perforations discussed above may have some utility, the inventors have recognized and appreciated techniques to form a gas-permeable shell mold using stereolithography or similar processes from a liquid photopolymer resin. Indeed, if the shell mold is made from sufficiently permeable material, it may be possible to reduce the number of perforations or even avoid perforations altogether. This would be advantageous, as a high resolution and smooth surface finish of stereolithographic parts is typically a particularly desirable aspect of this additive manufacturing technique.

According to some embodiments, a permeable shell may be formed by the introduction of one or more non-reactive additives (NRAs) to any one of a number of additive manufacturing materials such that NRAs are incorporated within the final polymer matrix formed during the fabrication process. As discussed above in relation to step 102, these additives may be added to a composition comprising a liquid photopolymer and the mold fabricated in act 102 from said composition. As used herein, a "NRA" refers to any compound that does not chemically bond to a polymer matrix produced during the additive fabrication process. Thus, a NRA is present in an initial composition from which a shell mold is fabricated, and subsequent to said fabrication, is not chemically bonded to the polymer matrix formed from said composition. Examples of relevant polymer matrices include thermoplastics, such as those thermoplastics known to be useful in sintering, fused filament, or similar fabrication processes, or thermoset polymers, such as those thermosets known to be useful in polymerization-based fabrication processes, such as stereolithography.

Once a shell mold is fabricated from a photopolymer and NRA composition (which may include other components as well), the NRA(s) may then be removed via a secondary process. As one example, a NRA may be selected for preferential solubility, as compared to the polymer matrix, with respect to a convenient solvent. Immersing the composite NRA and polymer object into such a solvent may then result in the NRA dissolving into solution, while leaving the polymer matrix structurally intact. Alternatively, or in addition, a NRA may be selected to react to a thermal process, such that the NRA offgasses or leaches from the polymer matrix upon exposure to elevated temperatures. Provided that the structural integrity of the polymer matrix is maintained, the removal of NRAs from the polymer matrix using any of the above or related techniques may result in a polymer matrix with numerous voids where NRA had previously been incorporated into the matrix. This process may thereby produce a porous mold by producing a polymer network through which gas may travel from the interior to the exterior of the mold, or vice versa.

In some embodiments, it may be particularly advantageous to fabricate a mold containing an amount of a NRA sufficient that a large number of discrete NRA domains are in contact or nearly in contact with other domains. The resulting voids, after removal of NRAs from the matrix, thus tend to form open cell networks throughout the matrix. In addition to providing pathways for gas permeability through the resulting porous matrix, such open cell networks may also assist in the further removal of NRAs from the composite matrix by allowing solvent or other removal materials to penetrate more readily into the matrix, and for any fugitive NRA materials to exit more readily.

The inventors have recognized and appreciated, however, that to produce such an arrangement where a large number of NRA domains are in contact or nearly in contact with other domains, a substantial volume loading (e.g., greater than 40% by volume) of the solid NRA into the liquid photopolymer precursor may be necessary. Such a degree of loading may result in significant increases in viscosity, which may be sufficiently high to prohibit or inhibit the additive fabrication process using such a composition. While some techniques may improve the suspension of the solid NRA in the liquid photopolymer, these techniques typically involve preventing the solid particles of NRA from coming into contact or "clumping," and therefore may have the undesirable effect of preventing contact between NRA particles in the final composite matrix, thus reducing the potential connections between cells in any resulting open cell network. Solid NRAs do, however, possess a number of useful and desirable properties. For instance, the size of any eventual pores in the resulting matrix can be substantially controlled by varying the size of the solid NRA particles introduced into the liquid photopolymer precursor.

The inventors have recognized and appreciated that the limitations described above with respect to solid NRAs may be addressed by using both solid and liquid NRAs within the polymer matrix. Among other benefits, the combination of solid and liquid NRAs allow for the composite mixture to have a lower viscosity than solid NRAs alone would allow for, while having a higher rigidity than liquid NRAs alone would allow. Moreover, the combination of the solid and liquid NRAs may allow for more free contact between the solid and liquid NRA domains. This is particularly true wherein the solid and liquid NRAs have similar chemical affinity, such as hydrophilic properties. This is believed to create, in effect, bridges or connecting domains of liquid NRA between solid NRA particles, even where both the liquid NRA and solid NRA components are individually well dispersed. The result is the creation of well-connected and thus porous open cell networks within a fabricated mold.

As with solid NRAs, when used alone, a large volume fraction of liquid NRA, often 40-50% by volume, would be required to form the desired open cell network. This large volume fraction of liquid NRA may have an unwanted plasticizing effect, making the cured material softer and weaker. In addition, as with the solid NRA, techniques commonly used for improving the stability and microphases of the liquid NRA within the liquid photopolymer precursor may compromise the ability to form a connected open pore network, by preventing regions of liquid NRA from coming into contact in the polymer matrix.

In either case of using only liquid NRAs or only solid NRAs, it may be difficult to provide a material with acceptable properties in its precursor state while achieving highly porous open cell networks in the final product. In part this is because particles within the polymer matrix are unlikely to touch one another at anything other than the highest concentration. In the case of using solid NRAs, this is because a practical photopolymer resin containing solid NRAs has the particles "well dispersed," such that solid NRA particles have been mixed into the monomer matrix in such a way that they are not touching each other but are in fact completely surrounded by monomer. This process has the aim of slowing the settling of these particles, as well as reducing the viscosity of the resin. However, this means when the resin is cured, the particles will not be touching, which is not conducive to the formation of an open cell network. This may be solved by having a very high loading of solid NRAs, in order to make the distance between particles as small as possible. This has the aforementioned disadvantages of making the formulation very viscous. When using liquid NRAs alone there is a similar issue. The liquid NRA is phase-separated from the polymer matrix, which is again achieved by ensuring the liquid NRA is well dispersed such that the microphases are not contacting each other. In view of the above, there are distinct advantages to using both solid and liquid NRAs in a photopolymer composition.

According to some embodiments, a composition from which an object may be fabricated may comprise a liquid photopolymer, a solid NRA and a liquid NRA. The amount of the liquid photopolymer may comprise at least 20%, at least 30%, at least 35%, at least 40%, at least 42%, or at least 43% of the composition by volume, and may comprise up to 60%, up to 55%, up to 50%, up to 48%, or up to 47% of the composition by volume. According to some embodiments, combinations of the above-referenced ranges are also possible. For instance, according to some embodiments, the amount of the liquid photopolymer may comprise an amount between 30% and 60% by volume of the composition, may comprise an amount between 40% and 55% by volume of the composition, or may comprise an amount between 43% and 47% by volume of the composition. In some embodiments, the liquid photopolymer may comprise an amount approximately equal to 45% by volume of the composition. The amount of the solid NRA may comprise at least 20%, at least 30%, at least 35%, at least 40%, at least 42%, or at least 43% of the composition by volume; and may comprise up to 60%, up to 55%, up to 50%, up to 48%, or up to 47% of the composition by volume. According to some embodiments, combinations of the above-referenced ranges are also possible. For instance, according to some embodiments, the amount of the solid NRA may comprise an amount between 30% and 60% by volume of the composition, may comprise an amount between 40% and 55% by volume of the composition, or may comprise an amount between 43% and 47% by volume of the composition. In some embodiments, the solid NRA may comprise an amount approximately equal to 45% by volume of the composition. The amount of the liquid NRA may comprise at least 2%, at least 3%, at least 5%, at least 7%, at least 8%, or at least 9% of the composition by volume; and may comprise up to 20%, up to 18%, up to 15%, up to 12%, or up to 11% of the composition by volume. According to some embodiments, combinations of the above-referenced ranges are also possible. For instance, according to some embodiments, the amount of the liquid NRA may comprise an amount between 3% and 20% by volume of the composition, may comprise an amount between 8% and 15% by volume of the composition, or may comprise an amount between 9% and 12% by volume of the composition. In some embodiments, the liquid NRA may comprise an amount approximately equal to 10% by volume of the composition.

According to some embodiments, the solid NRA may comprise particles having a mean diameter between 50 µm and 100 µm, or between 65 µm and 85 µm, or approximately 75 µm.

As one illustrative example of a suitable composition, a formulation of photopolymer resin was prepared by combining, by weight, 3 parts UV curable monomer, 1 part polyethylene glycol (PEG) (molecular weight 400), and 6 parts sodium bicarbonate ($NaHCO_3$). The UV curable monomer serves as the polymer matrix, and is curable using radiation cure additive manufacturing technologies. The $NaHCO_3$ may serve as a solid NRA that may be removed by the application of an acidic solvent, and PEG serves as a liquid NRA.

According to some embodiments, the liquid NRA may be selected from compounds with an incompatible affinity to the polymer matrix material, while retaining an affinity to the solid NRA particles and any chosen solvent for the removal of the NRAs. For example, various siloxane oils and/or propylene glycol may be a suitable substitute for PEG.

In some embodiments, the solid NRA may be a material that significantly increases in volume and/or decompose to produce a significant amount of gas when a solvent is applied to the shell mold. In particular, the inventors have found that the use of particles of $NaHCO_3$ to be particularly effective as a solid NRA. Such particles may be removed by use of an acidic liquid, such as diluted acetic acid. As will be appreciated, particles of $NaHCO_3$, being basic, will react with the acetic acid and produce carbon dioxide gas and a soluble salt. The increase in volume due to the gas evolution may help to force material from the polymer matrix, thus accelerating the NRA removal process. Moreover, the forces generated may be sufficient to compromise thinner regions of polymer matrix separating particles of the solid NRA, thus increasing the connectedness of the open cell network within the resulting porous material. Other components may also be chosen as solid NRA, either on their own or in combination with one or more solid NRAs. In particular, certain compounds are known to be gas evolving solids, known as "blowing agents." Such compounds, provided that they do not have an affinity for forming bonds with the polymer matrix, are appropriate for use as solid NRAs, including azodicarbonamide. Some such compounds require chemical reactions with a second chemical, such as an acidic salt NRA reacting with a basic solvent, while others may be activated in other ways, such as thermal treatment. Indeed, those having skill in the art will appreciate that $NaHCO_3$ has a further mechanism of action whereby gas may be produced in response to heating, without the presence of an acidic solvent. This dual-action nature may be particularly effective in causing extensively connected open cell networks, even in regions of the material where an acidic solvent has limited or no initial penetration.

In embodiments where a liquid NRA is incorporated into the polymer matrix, it is desirable that the liquid NRA be immiscible in the polymer matrix, such that the liquid NRA phase separates into microphases in the polymer matrix. These microphases are micro droplets within the polymer matrix composed of the liquid NRA. When using liquid NRA's, the eventual pore size may be controlled by altering the size of the microphases incorporated into the polymer matrix. This may be done in a number of ways, including using different mixing methods, changing the ratio of immiscible components, using multiple immiscible components to create a variety of pore sizes, or adding surfactants and/or dispersants to modify the miscibility of the components.

In the example of FIG. 1, in act 106 a metal or ceramic part may be cast from the mold fabricated in act 102 and in which pores were formed in act 104. In some embodiments, the part may be cast from the mold using gelcasting techniques, which are described in detail below. At a high level, however, a slurry (referred to below as a "feedstock") may be supplied into the mold, which is then allowed to cool and set. The slurry may contain a gelling agent that, when mixed with the other components of the slurry, causes the slurry to set into a gel when cooled. Alternatively, some other component of the slurry may be present within it that changes state when cooled sufficiently to set the part. In some embodiments, vacuum assisted casting techniques may be used to force a highly loaded metal or ceramic feedstock slurry into the void within the shell.

A wide variety of potential feedstocks may be utilized as casting materials in act 106, such as metal or ceramic slurries. In some embodiments, a feedstock may comprise a first and second component that solidify the feedstock within the mold. A first solidification component for the feedstock may have a temperature dependent characteristic such that a reduction of temperature causes the feedstock to solidify. In particular, the inventors have found feedstocks that are substantially water-based to be particularly advantageous for this purpose, such that the water within the feedstock may be frozen into ice crystals at temperatures below the freezing point of the water carrier within the feedstock. A second solidification component may be included within the slurry that acts to solidify the slurry in a manner that is not dependent on temperature. As one example, gelling agents such as agar or gelatin-based agents may be included in the slurry in order to react and contribute to the solidification of the slurry.

According to some embodiments, it may be advantageous for a feedstock to contain a high content of metal or ceramic particles, the amount of which is sometimes referred to as the "loading" of the slurry. Further, it is important that the slurry be of sufficiently low viscosity to allow it to flow into the mold without leaving unwanted voids. Finally, it is desirable that the slurry be capable of solidifying within the mold such that the cast part formed of solidified slurry may be removed and processed in subsequent steps. According to some embodiments, a volume loading of the solid (metal or ceramic) component may be between 40% to 55%. Particle sizes of the solid component may be between 5 µm to 50 µm, and a distribution of particles sizes in the feedstock may increase the packing density of the particles during the sintering process. Larger particles may have an advantage of producing a lower viscosity slurry, however may resulting in a less dense sintered part. The powder composition may be, for example, a metal (such as aluminum or tungsten)/metal alloy (such as stainless steel or tungsten carbide) or a ceramic compound (such as silica or alumina).

According to some embodiments, a solvent component of the feedstock may be a liquid compound that enables the feedstock to easily flow during the mold filling process. Water may be particularly advantageous as it has excellent properties when frozen and has a very low viscosity, allowing high loadings of solid particles to be used while maintaining reasonable slurry viscosity. Water also readily forms gels in a number of methods, and is less volatile than some other solvents, such as alcohols. According to some embodiments, the solvent may represent between 30% and 50% of the volume in the feedstock.

According to some embodiments, the feedstock may comprise a binding agent. The binding agent may be any of a number of compounds that allows the feedstock to transition from easily flowing slurry to a solid or gel like state during the demolding process. One illustrative binding agent is a thermoplastic gelling agent, such as a polysaccharide (e.g., gelatin or agar) or a similar synthetic polymer. These gelling agents work by forming a continuous molecule throughout the solvent, forming a gel. This gel can be reduced to a liquid upon heating, and reformed into a gel by cooling. Another illustrative binding agent is a thermoset cross linking monomer. These agents are composed of a monomer(s) that are capable of reacting to form a cross-linked polymer within the solvent. The reaction is initiated either chemically or photochemically, and is distinct from the thermoforming gel binding agent in that it is irreversible. Another illustrative binding agent is an inorganic binding agent, such as a silica based binding agent, that is soluble in the solvent while the solvent is liquid, and that becomes insoluble when the solvent is frozen, causing the binding agent to precipitate and bind to itself, forming a gel. Another illustrative binding agent is the solvent itself. For example, a feedstock using water as the solvent may be frozen to form a solid feedstock. Freeze drying techniques may then be used to remove the water without melting the feedstock, resulting in a part ready for sintering. According to some embodiments, a binding agent may comprise between 5% and 15% percent of the feedstock by volume.

As an illustrative embodiment, a feedstock may comprise approximately 50% by volume stainless steel 17-4PH powder with a particle size of approximately 10 µm, water as a solvent and agar as a binding agent. This feedstock is a rigid gel at room temperature, a low viscosity slurry at 60° C., and a hard solid at freezing temperatures. Sintered parts had a volume density of 95-98%, with 18% shrinkage.

In act 106, according to some embodiments, a slurry may be cast into a mold by the following process. First, a quantity of feedstock may be heated to an elevated temperature prior to use. Such heating may decrease the viscosity of a wide range of potential feedstocks and allow for the more rapid and effective injection of the feedstock into the mold. In some embodiments, heating the slurry feedstock to a temperature of 60° C. in an oven may be sufficient. The mold formed by the shell may then be placed into a vacuum-assisted injection chamber, such that the mold is placed within the chamber with one or more sprue structures extending through ports in the chamber to the outside of the chamber. These ports may then be connected, through a pressure tight valve, to a container for the injection of feedstock, such as a syringe or pressurized container. With the valve initially sealed, the vacuum chamber may then be depressurized, such as by exposure to a hard vacuum source. Generally the higher the vacuum the better, with good results obtained with >28 mmHg vacuum pressures. Lower vacuum pressures may also be acceptable, though with increased risk of bubbles or other voids remaining in the mold after the injection of the feedstock. Gases contained within the shell mold may be vented through the perforations described above into the vacuum chamber and then exhausted as the chamber pressure is lowered and reaches equilibrium. The valve to the feedstock container may then be opened, such that the vacuum pressure within the chamber, and within the shell mold, draws feedstock into the shell mold with significant force. Additional pressure may be applied to the feedstock container, compressing any bubbles or voids formed by outgassing. Once the injection process has been completed, and the shell mold is filled, the vacuum may be released.

According to some embodiments, it may be advantageous to further coat the shell mold prepared as above with an additional reinforcing layer on the interior or exterior of the shell mold. Ideally, such an additional layer would comprise a gas permeable material. Alternatively, the perforations described above may be applied after the coating of the shell mold, so as to cause the perforations to also render the additional layer gas permeable. In some embodiments, mixture of 20 parts sand, 1 part water, and 1 part polyvinyl acetate (PVA) glue forms an effective material to form an additional supporting coating onto a shell mold. Such a mixture may be used as an investment material, surrounding the shell mold, or may be adhered onto the surfaces of the shell mold with an adhesives. The mixture advantageously remains gas permeable after setting, allowing for the removal of gasses from the shell mold, as described below, including through vacuum venting perforations in the shell mold. When an adhesion, rather than investing, application of additional material is used, it may be advantageous to apply the additional layer material as a thin liquid, so as to allow the shell mold to be dipped and coated by the material in an effective manner. When such material is desired to be applied to only the exterior of the mold, the sprue and venting holes may be sealed or blocked during the application. Alternatively, if only the interior of the mold is desired to be coated, the coating material may be introduced via the sprue or venting holes into the interior and drained via the same channels. Such a technique may be particularly useful for the application of any desired release agents, such as silicone oil or other materials into the interior of the shell mold.

After injection, the slurry within the shell mold may be solidified and need to be removed from the shell mold. In embodiments of the present invention, the gel-like solidification mechanism within the slurry may have reacted after the injection process, thus forming a solidified or partially solidified feedstock within the shell mold, sometimes referred to as a "blue part." This blue part, however, may have very poor mechanical properties and thus be at high risk of breaking or distorting during the removal of the shell mold and any subsequent steps. This is particularly true for certain geometrical features, such as high aspect ratio extensions or finer details. Embodiments of the present invention overcome this difficulty, and others, by reducing the temperature of the solidified feedstock to below the freezing point of the temperature-sensitive solidification system. In some embodiments, this is advantageously the process of freezing the water-based slurry into a solidified composite of ice, slurry solids, and any other additives. This frozen blue part may possesses significantly improved mechanical properties as well as resistance to solvents.

In act 108, the mold may be softened to enable mechanical removal from the frozen blue part. As discussed above, molds formed from thermoset polymers cannot be dissolved by conventional solvents, but the inventors have recognized and appreciated that certain solvents may nonetheless soften the polymers over time to such an extent that the polymers can be removed from the blue part.

According to some embodiments, in act 108 the blue part, possibly already frozen, may be immersed in a bath of solvent held at a temperature below the freezing point of the temperature-sensitive solidification system. This solvent advantageously penetrates the structure of the shell mold materials causing it to substantially weaken or otherwise degrade in mechanical stability to a point where it may be easily removed by hand, or with the assistance of suitable tools, from the frozen surface of the blue part within the shell mold. This removal process is made substantially easier and more effective by maintaining the blue part at the lowered temperature, thus increasing its strength and resistance to any deforming forces that may be applied during the removal of the shell mold material. In embodiments described above using Formlabs-brand products, the inventors have found immersing the shell mold and encased blue part into a bath of acetone held below 0° C. to be particularly effective.

Without intending to be limited to a specific theory, the inventors theorize that acetone resin penetrates into the cured "Durable" photopolymer material forming the shell mold, causing the polymer material to undergo an expansion referred to herein as solvent swelling or simply "swell." Such swelling, in turn, substantially decreases the mechanical properties of the photopolymer material forming the shell mold such that previously stiff and unyielding cured material may be transformed into a soft, easily tearable material suitable for removal using comparatively little force. In general, materials formed using photopolymer materials are within a class of polymers known as thermoset polymers. Such thermoset polymers may undergo greater solvent swelling to the extent the material has a lower crosslink density and/or a lower glass transition temperature. In turn, increased solvent swelling typically results in decreases in mechanical properties and thus easier removal of shell mold material.

Irrespective of how the mold is softened in act 108, in act 110 the mold may be mechanically removed, which may include manual peeling and/or tearing away of the shell material once degraded by the solvent.

According to some embodiments, a shell mold may be immersed in a chilled solvent bath then taken out of the bath for removal of the shell material after it has been sufficiently degraded by the solvent. In some embodiments, the shell mold may be removed from the chilled solvent bath and placed into another environment with reduced temperature, such as a water bath or cold chamber. The latter approach may be preferable in some cases, so as to maintain the frozen state, and subsequent stability, of the blue part, during the removal of the shell mold material. The de-molded blue part may be said to be in a frozen gel state, retaining the majority of the feedstock solvent (e.g., water). Once the blue part is removed from the mold, it may be allowed to warm to room temperature, or above, such that the feedstock solvent may evaporate. During this stage, the non-temperature dependent solidification component provides the blue part with sufficient structural stability to avoid deformation or other damage. However, as the warming and evaporation process may be conducted without physical insult to the blue part, the required mechanical properties are significantly less than those for other steps. Once the feedstock solvent has evaporated, the remaining components of the feedstock material have typically formed a rigid and easier to handle form, sometimes known as a "green part."

Such green parts may then be further processed using techniques of debinding and sintering. In some embodiments, the green part may be placed into a furnace and a debinding and sintering heating schedule applied to the feedstock material, such as those schedules for metal injection molded (MIM) 17-4PH parts. This process generally consists of holding the green part at an elevated temperature while any remaining solidification agents are volatilized and outgassed from the green part. At this stage the part undergoes the first major step of shrinkage. The resulting part is often known as a "brown part". Next the furnace may be ramped to a sintering temperature at which point the sintering and final shrinkage/densification occurs, resulting in the final, nearly fully dense part. Embodiments of the present invention are capable of yielding parts with densities >95%.

According to some embodiments, additional supporting structures may be incorporated into the furnace during the debinding and heating process in order to help counter any potential deformation due to gravity, shrinkage stresses, or other distortions. Some geometries are known to be more at risk of such distortions—for example, high aspect ratio features and cantilevered geometries. These supporting structures, sometimes referred to as "firing furniture", are structures that physically support the part during debinding and firing to avoid these distortions. Firing furniture may be made out of the same material as the part it is supporting. In doing so, the intended result is that the furniture shrinks the same amount, and at the same time, as the part it is supporting. Such firing furniture has, heretofore, typically been generated manually for each specific green part geometry by a manual process. The process resulting in the formation of a shell mold, above, includes a geometrical description of the surface of the part. Such geometry may be readily used in order to automatically generate firing furniture corresponding to the green part. As an example, the volume of the green part may be subtracted or removed, such as by geometrical Boolean operations, from a base shape of potential firing furniture, such as a rectangular prism of sufficient dimensions to encompass the green part. Alternatively, the base shape may contain voids, such as an area filled with a scaffolding structure akin to the supporting scaffolding discussed above. Once the geometry is calculated, the "furniture" part may be converted into a shell mold and fabricated as above, with the intended final part placed onto the resulting furniture during the casting. Alternatively, the geometry of the firing furniture may be fabricated more directly utilizing a UV curable ceramic slurry. Several UV curable ceramic slurries have been demonstrated to print on commercially available stereolithography printing platforms. Such slurries are designed to go through a two-stage firing process, with a lower temperature debinding step followed by a higher temperature sintering step, similar to the approach above. Moreover, such slurries may be optimized to obtain percentages of shrinkage as close as possible to those of the primary feedstock, so as to preserve the match in geometrical distortion during the firing process.

Figure 2:
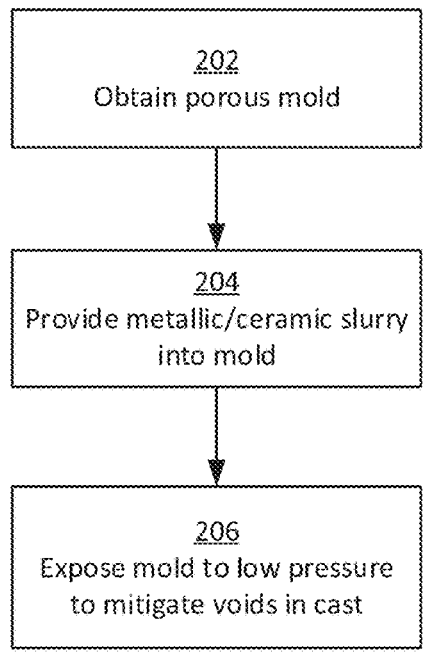
FIG. 2 is a flowchart of a method of casting a metal and/or ceramic object from a porous mold, according to some embodiments.

FIG. 2 is a flowchart of a method of casting a metal and/or ceramic object from a porous mold, according to some embodiments. Method 200 is an illustrative example of act 106 discussed above in relation to FIG. 1, according to some embodiments. In the example of FIG. 2, a porous mold is obtained in act 202 and a metallic/ceramic slurry provided into the mold in act 204. In act 206, the porous nature of the mold is exploited by positioning the mold in a low pressure environment so that the slurry is able to fill the mold and the presence of voids in the resulting cast is mitigated. It will be appreciated that acts 204 and 206 may occur simultaneously (e.g., the slurry may be provided to a mold already in a low pressure environment) in some embodiments.

Figure 3:
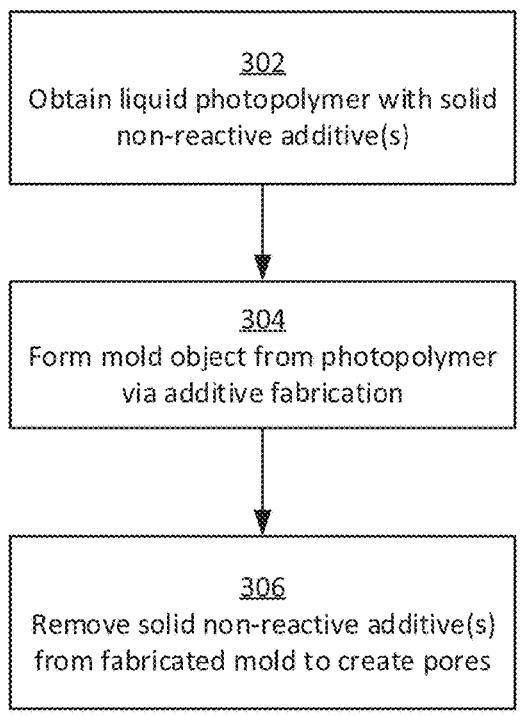
FIG. 3 is a flowchart of a method of forming a porous mold via additive fabrication, according to some embodiments.

FIG. 3 is a flowchart of a method of forming a porous mold via additive fabrication, according to some embodiments. Method 300 is an illustrative example of acts 102 and 104 discussed above in relation to FIG. 1, according to some embodiments. In the example of FIG. 3, a composition of a liquid photopolymer and solid NRA is obtained in act 302. In some embodiments, the composition may also include a liquid NRA as discussed above. In act 304, a mold object is additively fabricated from the composition, such as via stereolithography. In act 306, the solid NRA is removed from the mold object via any of the techniques discussed above (e.g., reacting a $NaHCO_3$ solid NRA with an acid).

Figure 4:
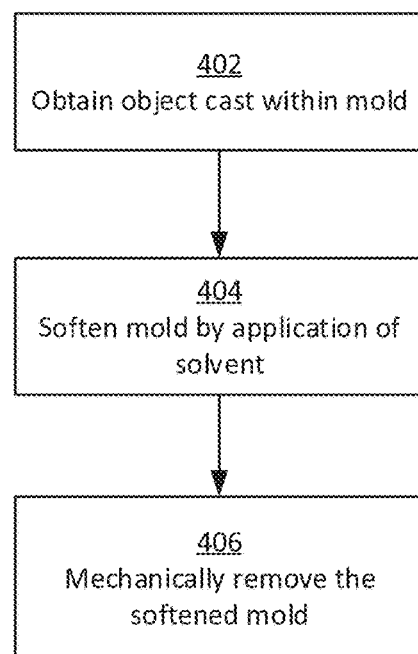
FIG. 4 is a flowchart of a method of removing a fugitive mold formed via additive fabrication, according to some embodiments.

FIG. 4 is a flowchart of a method of removing a fugitive mold formed via additive fabrication, according to some embodiments. Method 400 is an illustrative example of acts 108 and 110 discussed above in relation to FIG. 1, according to some embodiments. In the example of FIG. 4, an object cast within a mold produced via additive fabrication is obtained in act 402. In act 404, the mold is softened by application of a solvent. For example, a mold formed from a thermoset polymer may be softened by acetone, as discussed above. In act 406, the mechanically compromised mold may be mechanically removed from the object.

Figure 5:
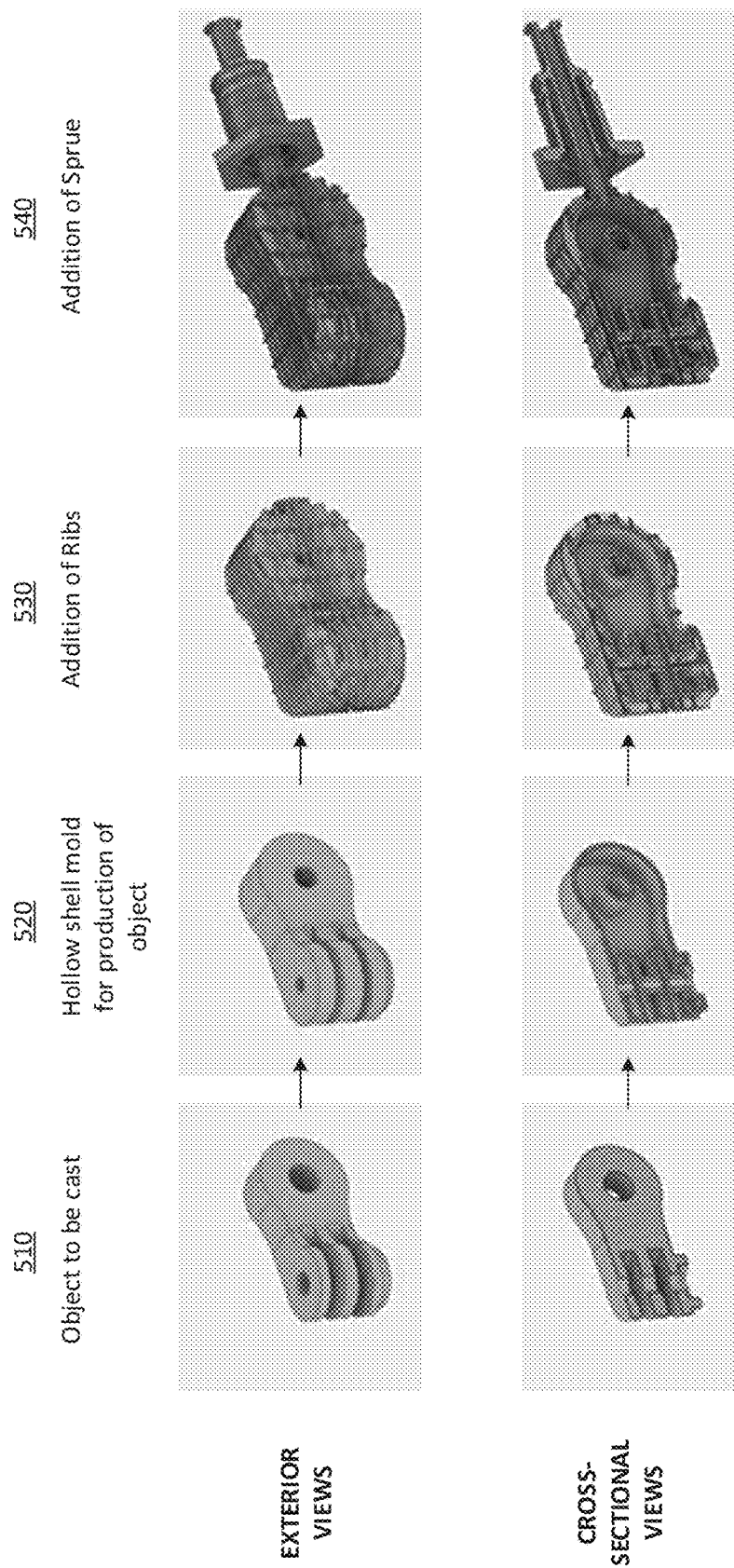
FIG. 5 depicts an illustrative process of generating a three-dimensional model suitable for fabrication as a fugitive mold, according to some embodiments.

FIG. 5 depicts an illustrative process of generating a three-dimensional model suitable for fabrication as a fugitive mold, according to some embodiments. The steps of FIG. 5 may be performed by a suitable software application, which may perform the illustrated steps automatically when provided with a three-dimensional model of an object to be cast as input.

In the example of FIG. 5, an object to be cast is represented in step 510 by both an exterior view (upper) and a cross-sectional view (lower) of the same object. As discussed above, in step 520, suitable software may automatically generate a hollow shell object based on the object of step 510. In particular, the hollow interior of the hollow shell mold is such that the object to be cast would fit inside it. Since the shell has a finite thickness, this naturally results in an increase in the total volume of the object relative to the object of step 510. As discussed above, in some embodiments, the shell may be increased in scale by the software to counteract the expected effects of shrinkage during casting and sintering of the object from the mold.

Figure 6:
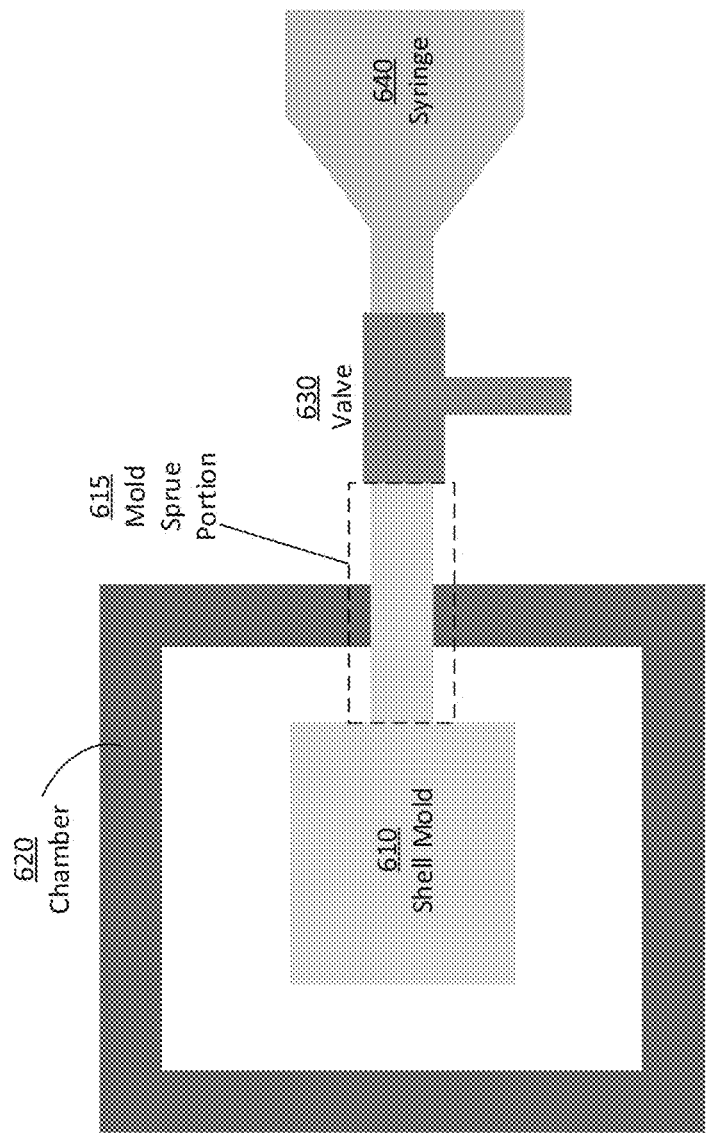
FIG. 6 is a block diagram of a system suitable for casting a metal and/or ceramic object from a porous mold, according to some embodiments.

In the example of FIG. 5, reinforcing structures in the form of ribs are automatically added by the software to the hollow shell mold in step 530. As discussed above, these ribs may increase the structural integrity of the hollow mold without altering the interior of the shell. In step 540, a sprue component is attached to the ribbed shell mold of step 530. As discussed above, the sprue may both provide a suitable port for injection of feedstock into the mold interior and may provide a pressure seal when disposing the mold in a low pressure environment by providing a plug between the parts of the object that are inside and outside of the low pressure environment. FIG. 6 provides an example of how such a sprue might be utilized in this manner. In the example of system 600, a shell mold 610 including a sprue portion is positioned through a port into a vacuum chamber 620. The body of the shell mold is located in the low pressure environment of the chamber, but part of the mold (the sprue portion 615) extends outside of the chamber to a valve 630. The valve may be actuated to supply feedstock from syringe 640 into the shell mold. If the mold is porous, any air within the shell mold may escape into the vacuum chamber, allowing the feedstock to substantially fill the mold.

According to some embodiments, system 600 may be operated in an alternate manner to perform a hydraulically reinforced casting process. In such a process, chamber 620 may be filled with an oil or other liquid and sealed off, such that when pressure or vacuum is applied to the shell mold 610 via the valve 630 the liquid-filled chamber resists deformation of the mold. An illustrative and non-limiting injection process is as follows.

After the shell mold 610 is mounted into chamber 620, the chamber may be filled with a liquid, which may include a vegetable oil, silicone oil and/or a vacuum oil (which may or not be a silicone-based vacuum oil). In some cases, the liquid-filled chamber may be degassed. A vacuum may then be applied to the shell mold through the valve 630 to evacuate the mold. As discussed above, the liquid in the chamber may resist any deformation of the mold that might otherwise result from said evacuation. A pressurized source of feedstock may then be switched with the vacuum to quickly fill the mold. For instance, a syringe of feedstock may be attached to an outlet of the valve 630 and compressed air applied to the syringe. The valve 630 may be switched from the vacuum source to the feedstock outlet, which fills the mold with feedstock. After the feedstock in the mold sets (which in some cases may include cooling of the feedstock), the liquid can be drained from chamber 620 and the mold removed.

FIG. 7A depicts the structure of a mold formed via additive fabrication and having solid and liquid additives present therein, according to some embodiments. As discussed above, solid and liquid NRAs (711 and 712, respectively) may form a network within the cured photopolymer 715 of a fabricated object, an example of which is shown in FIG. 7A. Once the NRAs are removed (techniques for which are discussed above) an open cell structure results, as shown in FIG. 7B.

While the proceeding inventive disclosure is provided with embodiments directed to the casting of metal, it should be appreciated that the inventions herein may be applied across a wide range of domains and should not be so limited. As one example, an additively fabricated shell material that is permeable has been described. Such permeable materials have multiple applications and the utility of permeable molds has been demonstrated. As one example, the machining of thermoforming molds out of permeable material may be performed to improve the level detail achievable in thermoforming, as well as eliminating the need to add pinholes to the mold, which result in small surface defects in the final product. Injection and blow molds are sometimes machined from permeable materials to reap similar benefits. Additively fabricated molds are already used in the thermoforming industry, and to a lesser extent in the injection and blow molding industry. An additively fabricated permeable material has clear potential utility in these industries. Moreover, permeable materials manufactured according the techniques above may be impregnated with alternative materials, potential without or without vacuum assistance, to achieve composite materials with improved mechanical, thermal, electrical, or chemical properties. In addition, permeable materials may have utility in industries that require custom high surface materials, such as filtration, catalysis, bio-scaffolding, energy storage, and more.

Moreover, it should be appreciated that although certain photopolymer compositions have been described herein in the context of gelcasting, such compositions may have utility in other contexts. As such, the photopolymer compositions described herein should not be viewed as being limited to any particular uses or applications.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of forming a porous object, the method comprising:
    forming, via additive fabrication, an object comprising a hollow shell of rigid material, wherein the material comprises a thermoset polymer and a plurality of solid particles embedded within the polymer; and
    removing at least some of the solid particles from the object, thereby forming a plurality of pores in the hollow shell.

2. The method of claim 1, wherein the solid particles include particles of $NaHCO_3$, and wherein removing the at least some of the solid particles comprises reacting the solid particles with an acidic liquid.

3. The method of claim 1, wherein the solid particles include particles of a water-soluble salt, and wherein removing the at least some of the solid particles comprises dissolving the solid particles in water.

4. The method of claim 1, wherein removing the at least some of the solid particles comprises applying heat to the object.

5. The method of claim 1, wherein forming the object comprises applying radiation to a mixture comprising a liquid photopolymer, thereby curing the liquid photopolymer into the thermoset polymer.

6. The method of claim 1, wherein a mean size of the plurality of pores is between 20 μm and 100 μm.

7. The method of claim 6, wherein the mean size of the plurality of pores is between 40 μm and 60 μm.

\* \* \* \* \*